United States Patent Office 3,060,163
Patented Oct. 23, 1962

3,060,163
PROCESS FOR THE OXIDATION OF HIGH MOLECULAR WEIGHT ALIPHATIC WAXES AND PRODUCT
Michael Erchak, Jr., Morris Township, Morris County, N.J., assignor to Allied Chemical & Dye Corporation, New York, N.Y., a corporation of New York
No Drawing. Filed June 15, 1955, Ser. No. 515,770
9 Claims. (Cl. 260—94.9)

This invention relates to a novel process for the controlled oxidation of high molecular weight, hard, waxy aliphatic compounds, and to the oxidized product.

The high molecular weight waxes as herein defined, are characterized by high degrees of hardness, toughness, light color, etc., which, except for a primary drawback, adapt them for a multitude of uses, particularly in the coating and impregnation fields. Unfortunately, the majority of such waxes suffer, to greater or lesser extents, from deficiencies in ease of emulsification in water. Since many important wax uses require application of the wax from an aqueous emulsion, such deficiencies are a major deterrent to widespread use of such waxes.

It is known that the emulsifiability of waxes may be increased by subjecting them to oxidation with an oxygen-containing gas, such as air. Such oxidations have been applied with some success to soft waxy materials of low molecular weight, i.e., below about 500, such as paraffin wax, lignite wax, peat wax, crude mineral waxes, petroleum residue waxes, tank bottoms and the like. The resulting waxes, however, retain their soft characteristics and are thus unsuited for uses wherein a hard wax such as carnauba wax is required.

Efforts directed to improvements by oxidation of the hard, high molecular weight waxes, have resulted in production of significantly softer less tough end products, due to severe chain cleavage of the large molecules with the production of mixtures of carboxylic acids of lower carbon contents than the initial waxes, together with the production of by-products from side reactions such as esters, aldehydes, lactones, ketones, etc., resulting in discoloration and the production of malodorous compounds. Such oxidations have thus produced end products totally different from those of the starting materials in properties as well as in chemical constitution, and have rendered such end products totally unsuited for many hard wax uses.

Other efforts aimed at producing hard, emulsifiable waxes have included subjecting mixtures of waxes with various film-forming additives, such as drying and semi-drying oils, chlorinated hydrocarbons, plastic polyethylenes (molecular weights in excess of 10,000) etc. to oxidation with air. Such procedures, while apparently producing end products with enhanced emulsifiability, nevertheless so altered the character of the starting material wax as to destroy its initial characteristics and rendered such products suitable for use only in those compositions in which the presence of the additive was not objectionable.

A primary object of my invention is to provide hard waxes of good emulsifiability.

Another object of the invention is to provide a controlled oxidation process for the oxidation of high molecular weight, hard, waxy aliphatic compounds which produces a hard, waxy product of increased emulsifiability.

Another object of the invention is to carry out such controlled oxidation process in the absence of film-forming additives and catalysts.

A still further object is to provide a controlled oxidation process for the oxidation of hard, waxy aliphatic compounds having molecular weights between about 1,000 and about 3,000, to provide a wax product of increased emulsifiability with a minimum of reduction in its initial hardness characteristics.

A still further object of the invention is to provide a controlled oxidation process for the oxidation of hard, waxy polymers of ethylene having molecular weights between about 1000 and about 3000, whereby a hard, waxy product of increased emulsifiability is produced with a minimum of reduction in hardness, toughness and color.

These and other objects are accomplished according to my invention, wherein normally solid, hard, waxy aliphatic compounds, having molecular weights between about 1,000 and about 3000 are subjected, in the molten state, to the action of an oxygen-containing gas under such conditions of temperature, pressure and quantity of oxygen as to produce the reaction of between about ½ pound and about 7 pounds of oxygen per 100 pounds of waxy compound per hour.

In carrying out the process according to my invention, the oxidation must be effected in such a manner that the resulting waxes are readily emulsifiable in water, but still retain their desired light color, toughness and hardness characteristics, and are free from malodorous products. Thus, degradative side reactions resulting from over-oxidation are particularly to be avoided, as such side reactions are accompanied by marked softening and reduction in toughness of the wax and by production of dark colored and malodorous products. Avoidance of these deleterious results is accomplished by so regulating the rate of oxygen reaction so that reaction proceeds at a rate which is sufficiently rapid to insure development of emulsifiability in commercially advantageous short periods, but which is slow enough to avoid local over-oxidation, resulting in a degraded, non-uniform product.

Proceeding at the critical oxidation rates, good emulsifiability can be obtained in relatively short periods, usually after an amount of oxygen equivalent to between about 1 pound and about 7 pounds per 100 pounds of wax have been reacted, and during this period, while some molecular weight reduction takes place, only in an insignificant diminution in hardness and toughness of the resulting waxes occurs. Continuing the oxidation at the critical rate has relatively less further effect on the emulsifiability of the wax, but produces an increasing degree of molecular weight reduction producing resulting waxes of somewhat different characteristics from the starting products but which still retain their desirable hardness and toughness characteristics to a large extent.

Thus, in the process of my invention wide latitude is permissible in the quantity of oxygen which may be introduced into the waxes, permitting a wide range of desired additional properties in the resulting emulsifiable wax product without essential diminution in desirable qualities, such as color, hardness, toughness, etc. of the unoxidized starting waxes.

In carrying out the process according to my invention, high molecular weight wax as defined, is charged to an insulated pressure vessel equipped for application of heat, preferably after first melting the wax. If desired, the oxidizer may be placed under pressure prior to the addition of the wax, the pressure in such case being somewhat below the reaction pressure. The oxidizer is then heated to reaction temperature, and an oxygen-containing gas is brought into contact with the hot, liquid wax at the desired rate of flow. The pressure is brought to the desired reaction pressure, and at this point venting of unreacted gas is initiated, and continued in such a manner as to maintain the desired pressure. When the desired degree of oxidation has been effected, influx of oxygen-containing gas is discontinued, and the resulting oxidized wax is discharged from the oxidizer.

Under the conditions of oxidation according to my invention, as brought out hereinafter, degradation of the wax to volatile non-waxy materials is slight, usually amounting to not more than about 5% by weight of the wax. Even such small percentages of by-products, however, may result in a diminution in the color stability of the wax causing it to darken on ageing or in the production of unpleasant odors. Accordingly, if desired, the oxidized wax may be subjected to a purification and deodorization treatment to remove such minor quantities of decomposition and fragmentation products of the reaction which may have formed. This purification may conveniently be accomplished by blowing the molten wax with an inert gas, such as steam, nitrogen, carbon dioxide or air to remove the volatile decomposition products. If air is used, the blowing should be carried out at temperatures not exceeding about 135° C., since virtually no oxidation of the wax takes place at or below this temperature.

I have found that rate of oxidation is determined largely by conditions of temperature, pressure and flow of oxygen-containing gas, and that if these are so correlated that the rate of oxygen reaction with the waxy material is at least about ½ pound of oxygen per 100 pounds of waxy material per hour, and not more than about 5 pounds of oxygen per 100 pounds of wax per hour, satisfactory enhancement of the emulsifiability of the waxes can be obtained by the reaction of a total of between about 1 and about 7 pounds of oxygen per 100 pounds of wax in limited times, ranging from about 1 hour to about 8 hours without substantial degradation or cleavage of the wax molecule, and with a minimum diminution in the hardness and toughness of the treated wax, producing a hard, tough, emulsifiable wax.

Continuing the oxidation at the rate indicated, or at somewhat higher rates, i.e. up to about 7 pounds oxygen per 100 pounds wax per hour, until at least about 7 but not more than about 17 pounds of oxygen per 100 pounds of wax have reacted, waxes are produced, which, while still but little different in hardness and toughness characteristics from the initial waxes, possess a somewhat different nature than those of the starting material, somewhat resembling beeswax in character and properties. Under such conditions a certain amount of molecular cleavage takes place, resulting in substantial reduction in average molecular weights of the resulting waxes to values between about 500 and about 3,000. By controlling the reaction rate as indicated, however, this cleavage is accomplished with a minimum of color and odor degradative changes, a minimum of over-oxidation and a minimum of loss in hardness and toughness characteristics, if the oxygen addition does not substantially exceed the maximum indicated above.

The temperature and pressure ranges within which my process is operative to provide the desired reaction rate are narrow and critical. Suitable temperatures are within the range between about 135° C. and about 175° C., while $O_2$ partial pressures between ⅓ atmosphere and about 200 pounds per square inch are necessary to effect oxidation at the relatively low temperatures indicated. Preferably, air at pressures between about 200 and about 800 p.s.i.g. will be used. Temperatures below about 130° C. result in little, if any, oxidation even at the indicated pressures and over extended periods. Temperatures in excess of about 175° C., so increase the reaction rate that the reaction becomes autocatalytic and is difficult or impossible to control, producing rapid, destructive oxidation of the wax, and consequent reduction of the desirable characteristics of the wax, including a sharp diminution in its hardness and uniformity. The use of pressures within the range indicated permits a high rate of oxidation without subjecting the wax to high temperatures or to long periods at intermediate temperatures.

Suitable starting materials adapted for oxidation according to the process of my invention include the normally solid, hard, waxy, essentially polyethylenic compounds having molecular weights in the range between about 1000 and about 3000 and having initial hardness characteristics exhibiting penetrations below about 0.7 mm. as measured by the standard ASTM penetration test, D-5-25, i.e., using 100 grams, 5 seconds, 77° F. Waxes of molecular weight lower than about 500, such as the paraffins, etc., are usually sufficiently emulsifiable without oxidation but also do not usually have the high hardness characteristics suited for the uses for which the hard waxes of the present invention are adapted. Materials having molecular weights appreciably above 3000 do not produce sufficiently fluid reaction media under reaction conditions and hence are unsuited for treatment according to the process of the invention. Suitable starting material waxes as above defined usually have viscosity characteristics as measured in seconds by the standard Saybolt Furol test at 140° C. (ASTM-88-44) between about 10 and about 1,000 seconds, and melting points between about 160° F. and about 240° F.

As starting materials I may use any of the essentially polyethylenic waxes such as a polymerized ethylene having molecular weight and hardness characteristics within the indicated ranges, or in the form of a "telomer," i.e., a polyethylene wax having a terminal residue on the polyethylene chain, resulting from polymerization of ethylene in the presence of a co-reactant. Thus, particularly suitable for oxidation according to the process of my invention to produce products of outstanding utility in the fields of emulsifiable waxes, i.e., in floor polishes, textile and paper coatings, coating and impregnation of asbestos shingles, etc., are the waxy polymers of ethylene having molecular weights between about 1000 and about 3000, and penetrations as above defined of not more than about 0.7 mm. Suitable ethylene polymers may be prepared by subjecting the ethylene, either alone or in the presence of a co-reactant to temperatures between about 150° C. and about 300 and at pressures ranging from about 500 p.s.i. to about 7000 p.s.i. If a co-reactant is used, it may be, for example, a normally liquid organic compound free of olefinic unsaturation, e.g., consisting of carbon, hydrogen and oxygen or carbon, hydrogen and halogen, for example, an alcohol such as isopropanol, an ester, e.g., methyl propionate, a ketone such as acetone, an ether, an alkane, an alkyl benzene, etc.

When ethylene is thus polymerized in the presence of a co-reactant, for example, as disclosed in U.S. Patents 2,683,141 and 2,504,400, of Michael Erchak, Jr. a "telomer" is formed having a structure which is essentially polyethylenic and containing as a terminal addition to its polyethylene chain, a radical of the co-reactant. Such polyethylene waxes, containing an alcohol group in their structure, will be referred to herein as polyethylene/alcohol telomers and by this term is meant waxes prepared by polymerizing ethylene under wax-forming conditions in the presence of a liquid aliphatic alcohol having from 1 to 10 carbon atoms inclusive. For example, when ethylene is polymerized in the vapor phase in the presence of isopropanol vapor under the conditions indicated above, the structure of the resulting waxes may be essentially as written below:

$$CH_3(CH_2—CH_2)_nC(OH)(CH_3)_2$$

where "$n$" is an integer and the waxes are a mixture of individual homologs having varying values for "$n$" in the range of about 30 to about 150. Such polyethylene telomer waxes are thus characterized by a recurring —$CH_2$— group, i.e., they are essentially polymethylenic in structure. They may, however, contain a relatively small amount of branching, for example, perhaps one $C_4$ branch chain for each 30 linear carbons.

Thus the waxes suitable for use in my process are the essentially polyethylenic compounds, i.e., those characterized by the presence of a recurring —$CH_2$— group, from whatever source, having the molecular weight and hardness characteristics as defined above. Mixtures of various waxes of this character may also be used.

The waxy aliphatic compounds within the purview of my invention have melting point characteristics such that they are solids at normal room temperatures, i.e. 20° C.–25° C., but are liquids within the range of reaction temperatures and pressures employed in the oxidation process. They also have viscosity characteristics under such reaction conditions, which render them sufficiently fluid to permit adequate distribution of oxygen-containing gas throughout the liquid mass to obtain the critical oxidation rate specified, by conventional means widely employed for aerating liquids. Thus, suitable flow and distribution of oxygen-containing gas throughout the molten wax may be obtained by passing the gas into the wax through any of the usual devices, such as a pipe inlet or a conventional sparger to produce adequate distribution of oxygen-containing gas within the liquid. Contact of gas with the liquid is not unduly critical so long as the quantity present and its distribution within the liquid are sufficient to insure the desired critical rate of reaction with the wax. Suitable flow rate and means of distribution will vary, of course, with the design and size of the equipment used, etc. In general, flow rates between about ½ cubic foot/minute and about 7 cubic feet/minute have been found satisfactory for use in a reactor 3 inches in diameter by 20 feet in height charged with about 25 to 35 pounds of wax.

Any suitable oxygen-containing gas may be used to provide oxygen for the oxidation, preferably a mixture of oxygen with an inert gas, such as nitrogen, carbon dioxide, etc. While oxygen alone might be used, it would tend to increase the reaction rate unduly producing local over-oxidation resulting in a non-uniform product. Accordingly, I prefer to use an oxygen-containing gas, containing not more than about 50%, for example, between about 5 and about 50% oxygen by volume, the balance being an inert gas. I prefer to use air, an approximately 20% oxygen mixture, because of its availability.

As brought out above, my process may be employed without use of any catalyst or other additive.

The oxidation time, within the critical rates specified, will vary depending on the properties desired in the finished wax product. The oxidation will usually be continued, in any event, at least until a product having acceptable water-emulsifiability characteristics has been obtained. This time is readily determined by withdrawing a sample of wax and testing it for emulsifiability in a standard test formulation. Longer reaction times result in a larger amount of oxygen reacted and produce waxes which are somewhat darker and have lower melt viscosities than those produced at shorter oxidation times while still retaining their high hardness and toughness characteristics. Thus, a wide variety of properties, in addition to excellent emulsifiability, may be "tailored" into the wax products of my invention by variations in reaction time employed. In general, a reaction time of at least about 1 hour may be required to produce a wax product of good emulsifiability. In general, in the preparation of hard waxes of high melt viscosities, I prefer to continue the oxidation until between about 1 and about 7 pounds of oxygen per 100 pounds of wax have reacted. After oxidation has progressed sufficiently to insure a readily emulsifiable product, say to the extent of about 1 to 7 pounds of oxygen reacted per 100 pounds of wax, the melt viscosity and hardness characteristics may be adjusted downward by continuing the oxidation for the desired additional time necessary to produce any higher degree of oxidation desired. In general, however, I prefer to discontinue the oxidation after not more than about 17 pounds of oxygen per 100 pounds of wax have been absorbed, since resulting waxes tend to become unduly soft beyond this point, although greater degrees of oxidation may be effected under special circumstances.

While the exact mechanism of the oxidation reaction according to my invention is not entirely clear, the overall result of the oxidation is to add carboxylic acid groups to the large aliphatic molecules of the waxes, thus, in effect, producing long chain fatty acids. My waxes are characterized by an extremely low incidence of, or in many cases substantially complete absence of ester groups. Thus, in my new wax products, the saponification number (which measures both acid and ester groups) is substantially identical to or only slightly greater than the acid number (which measures only acid groups) so that my products all have an extremely low or zero ester number (saponification number minus acid number) and have ratios of saponification number to acid number usually of about one to about 1.2, and not more than about 1.5.

One of the primary advantages of my invention is that it permits modification of the hard non-emulsifiable waxes in such a manner as to render them readily emulsifiable with very little diminution in their hardness characteristics. "Hard" waxes as this term is used in the trade, are those waxes having penetration values according to the Standard ASTM penetration test, designated D–5–25 of not more than about 1.5 millimeters. In this test, a standard needle under a 100 gram load is brought to bear for a period of 5 seconds upon the surface of the wax, held at 77° F. The harder the wax, the less the degree of penetration of the needle. When oxidized according to the process of my invention, such waxes are rendered readily emulsifiable with a decrease in hardness amounting to not more than about 0.3 millimeter in the above hardness scale, usually with decrease in hardness of between about zero and about 0.2 millimeter. If oxidation is continued far beyond the point at which good emulsifiability is achieved, a somewhat further softening of the wax takes place, as brought out above. In general, I prefer not to carry such further oxidation beyond the point at which the penetration reaches about 1.5 millimeters as measured by the above test, while my preferred waxes will have penetrations of not more than about 0.5 mm. In order to avoid use of decimals, standard "penetration" values of hard waxes are often designated by a factor of ten times the penetration in millimeters obtained in the test. In such a scale, a "hard" wax would have a penetration value of not more than about 15.

In addition to their high molecular weight and superior hardness characteristics, the polyethylene waxes as above defined are characterized by a high degree of toughness, i.e., resistance to fracture upon submission to pressure or impact, in contradistinction to the excessive brittleness of most of the commonly available hard waxes. This characteristic renders these waxes extremely valuable in coatings such as floor coatings, textile and paper coatings, which are subjected to such stresses, and which tend to crack and break when made up of the common brittle waxes.

This characteristic of toughness may be measured by application of the standard Izod impact test, ASTMD–256–47T in which one end of a wax specimen, cast in the form of a bar ¼" by ½" by 3" is secured in the machine, and the other end is subjected to the impact of a weighted arm. The weight necessary to break the bar is reported as impact strength or toughness, in foot pounds per linear inch.

In accordance with the above test, the hard polyethylene waxes as defined, may have initial toughness characteristics in the neighborhood, for example of from about 2.0 to about 5.0, as compared to values of around 0.3 to 0.4 for commercially available hard waxes such as carnauba wax, the hard microcrystalline waxes and the Fischer-Tropsch waxes. When the hard polyethylene waxes are oxidized according to my invention the resulting waxes retain this toughness characteristic to a marked degree, usually suffering little or no measurable diminution in toughness and in many cases exhibiting enhanced toughness as compared to the starting material, particularly when the oxidation is carried to the higher levels, e.g. above about 7 pounds of oxygen reacted per 100 pounds of wax.

The color of the hard emulsifiable waxes prepared according to my invention is extremely light in comparison to that of most available hard waxes. As measured by a Union colorimeter according to ASTM method D-155-45T the waxes of my invention usually rate not more than about 3, often less than 1. According to this test, the wax is melted and placed in the cup of the colorimeter and viewed by transmitted light in comparison with a set of standard slides prescribed by the National Petroleum Association for measuring the color of waxes and designating them according to color. Thus, the lightest slide is No. 1, called "lily white," No. 1½ is called "cream white," No. 2 "extra pale," No. 2½ "extra lemon pale," No. 3 "lemon pale" and so on up to No. 7 "claret red." In general, oxidation of the starting waxes as defined results in only very slight, if any, degradation in their color, particularly in oxidations in which up to about 7 pounds of oxygen per 100 pounds of wax reacts, such oxidations usually reducing the color no more than about ½ point on the above scale. Oxidations which add up to 15% of oxygen, may cause a somewhat greater degradation of color, usually, however, not more than about 1 or 2 points.

As pointed out above, when the oxidation is carried out according to the critical conditions of my invention, diminution in average molecular weight of the waxes is not excessive. My preferred oxidized wax products have average molecular weights between about 1,000 and about 3,000.

The process of my invention may be carried out in any suitable equipment. In the illustrative examples set forth below, the equipment used consisted of a vertical, 3 inch inside diameter insulated steel pipe 20 feet high, closed at each end, having a top outlet valve actuated by a pressure regulator and equipped for heating to initiate the oxidation reaction and for cooling to remove heat of exothermic reaction after its initiation. In carrying out the oxidations in the examples, wax was melted in a separate vessel outside the reactor, and sufficient melted wax was then flowed into the reactor to fill the reactor about two-thirds full. The pressure regulator was set to maintain the predetermined desired pressure, the charge was heated to reaction temperature, then air under pressure at least sufficient to cause it to rise through the column was metered at the predetermined desired rate to the bottom of the reactor into the liquid wax through a ¼" diameter pipe, and became uniformly distributed throughout the liquid wax charge in rising through the column. When pressure in the reactor reached the predetermined value, according to the pressure regulator setting the automatic pressure control valve at the top opened to permit off gas flow at the rate necessary to maintain the predetermined pressure.

The flow of air was discontinued when the desired amount of oxygen had reacted as indicated by analysis of off gas samples taken at 15 minute intervals. The resulting oxidized wax was then cooled immediately to about 135° C., and withdrawn from the oxidizer to a deodorizer vessel wherein it was blown with air at a temperature between its melting point and 135° C. (virtually no oxidation taking place at these temperatures) for a period of about one hour, at about 4 to 5 cubic feet per minute per 30 pounds of wax. The resulting wax product was drained through several layers of cheese cloth into aluminum pans and allowed to cool and solidify.

Ease of emulsification may be evaluated by the following test. The standard test formulation is given below, consisting, in grams of

| | Grams |
|---|---|
| Oxidized wax | 30 |
| Oleic acid | 6 |
| Morpholine | 6 |
| Water | 138 |

The oxidized wax is melted, with care not to exceed a temperature of about 125° C., and the oleic acid is added. With the melt temperature at 120°-130° C., morpholine is added slowly.

The water is heated to 95-99° C. (just below boiling) in a 400 cc. beaker fitted with a 3 bladed, 2 inch diameter propeller type agitator (Arthur H. Thomas catalog No. 92-40 K), operated by a 1/10 horse power motor. With the agitator rotating at about 800 r.p.m., the hot melt, at 115-125° C., is added gradually to the hot water during a period of about 2 minutes, in such a manner that the melt stream enters the water at the top of the vortex caused by the stirring action, spiralling down the vortex and being emulsified enroute without accumulation in the vortex. When all the melt has been added to the water, stirring is reduced to about 400 r.p.m., the beaker is covered and its contents allowed to cool to 40-50° C. The emulsion is then weighed, and any weight loss, due to evaporation of water, is compensated by addition of water to restore original weight. The ease of emulsification of the wax was evaluated by the appearance and stability of the resulting emulsion rated as follows:

| Appearance: | Rating, ease of emulsification |
|---|---|
| Clear to translucent-stable | Excellent. |
| Translucent-stable | Very good. |
| Milky-fine particles-stable | Good. |
| Milky-coarse particles-stable | Fair. |
| Milky-separates on standing | Poor. |

The following specific examples further illustrate my invention: Except as otherwise noted, in all the examples hardness characteristics are shown in terms of penetration as measured by the Standard ASTM-D-5-25 test using 100 gms. 5 seconds 77° F.; viscosity as measured according to ASTM-D-88-44 Saybolt Furol seconds at 140° C.; impact as measured by Izod Impact test ASTM-D-256-47T with specimens unnotched; and color by ASTM-D-155-45T. In a few cases as noted, a 200 gram weight was used in the penetration tests. Within the range of values in the examples, the 200 gram weight gives a penetration about three times that with the 100 gram weight.

EXAMPLES 1-6

A polyethylene/isopropanol telomer wax having an average molecular weight of about 1500 and a hardness as determined by the Standard ASTM penetration test D-5-25 (100 g., 5 sec., 77° F.) of 0.26 mm. and which failed to yield even a "poor" emulsion when evaluated in the above test formulation was oxidized in the equipment and in the manner generally described above, under the conditions, and with the results indicated in Table I below.

viscosimeter at 75° C. and calculation of the molecular weight from the data thus obtained.

*Table I*

OXIDATIONS OF POLYETHYLENE WAX OF 1500 AVERAGE MOLECULAR WEIGHT

| Example No. | 1 | 2 | 3 | 4 | 5 | 6 |
|---|---|---|---|---|---|---|
| Temp., °C | 147–158 | 150–155 | 150–156 | 149–155 | 146–155 | 150–155 |
| Pressure, p.s.i.g | 500 | 500 | 500 | 500 | 500 | 500 |
| Time, hours | 2.48 | 1.95 | 2.00 | 1.83 | 1.75 | 2.85 |
| Air rate, c.f.m | 4.1 | 4.27 | 4.50 | 4.25 | 4.53 | 4.27 |
| Wax charge, lbs | 35.0 | 30.0 | 30.0 | 25.0 | 25.0 | 25.0 |
| Reaction rate [1] | 2.4 | 3.0 | 2.7 | 3.1 | 2.6 | 6.1 |
| Results: | | | | | | |
| Initial penetration, mm | 0.26 | 0.25 | 0.27 | 0.27 | 0.27 | 0.27 |
| Final penetration, mm | 0.46 | 0.46 | 0.40 | 0.43 | 0.43 | 1.49 |
| Initial viscosity | 131 | 139 | 131 | 136 | 136 | 117 |
| Final viscosity | 75 | 86.2 | 81.8 | 86.5 | 84.9 | 80.0 |
| Emulsification | V.g. | V.g. | V.g. | V.g. | V.g. | V.g. |
| Total O₂ reacted/100 lbs | 5.9 | 5.8 | 5.4 | 5.6 | 4.5 | 17.3 |
| Saponification number | 21 | 18 | 16 | 16 | 16 | 46 |
| Acid number | 21 | 18 | 16 | 16 | 16 | 46 |
| Ester value | 0 | 0 | 0 | 0 | 0 | 0 |
| Color | <1 | <1 | <1 | <1 | <1 | 2 |

[1] Pounds O₂ reacted/100 pounds charged/hour.

EXAMPLES 7–11

A polyethylene/isopropanol telomer wax having an average molecular weight of about 2,000 and a hardness as determined by the Standard ASTM penetration test D–5–25, of about 0.20 mm. and characterized by non-emulsifiability, was oxidized in the equipment and in the manner generally described above, under the conditions and with the results indicated in Table II below.

*Table II*

OXIDATIONS OF POLYETHYLENE WAX OF 2,000 AVERAGE MOLECULAR WEIGHT

| Example No. | 7 | 8 | 9 | 10 | 11 |
|---|---|---|---|---|---|
| Temp., °C | 149–156 | 146–155 | 150–153 | 145–156 | 147–156 |
| Pressure, p.s.i.g | 500 | 500 | 500 | 500 | 500 |
| Time, hours | 1.78 | 1.87 | 2.05 | 2.03 | 1.87 |
| Air rate, c.f.m | 4.0 | 4.1 | 4.1 | 4.5 | 4.6 |
| Wax charge, lbs | 25.0 | 25.0 | 30.0 | 35.0 | 35.0 |
| Reaction rate [1] | 3.0 | 2.9 | 2.6 | 2.7 | 3.2 |
| Results: | | | | | |
| Initial penetration, mm | 0.20 | 0.20 | 0.18 | 0.18 | 0.18 |
| Final penetration mm | 0.34 | 0.39 | 0.34 | 0.32 | 0.32 |
| Initial viscosity | | | | 181 | 162 |
| Final viscosity | 123 | 120 | 98.8 | 119.5 | 107.7 |
| Emulsification | V.g. | V.g. | V.g. | V.g. | V.g. |
| Total O₂ reacted/100 lbs | 5.4 | 5.4 | 5.3 | 5.5 | 6.0 |
| Saponification number | 14 | 15 | 15 | 15 | 15 |
| Acid number | 14 | 14 | 15 | 15 | 15 |
| Ester value | 0 | 1 | 0 | 0 | 0 |
| Color | <1 | <1 | <1 | <1 | <1 |

[1] Pounds O₂ reacted/100 pounds charged/hour.

EXAMPLE 12

To illustrate the effect of degree of oxidation (within the standard controlled oxidation rate) on molecular weight, three samples of a polyethylene/isopropanol telomer wax having an average molecular weight of 2,000 were oxidized according to the general procedure described above, and using no additive, at a rate such that 3.5 pounds of oxygen per 100 pounds of wax was reacted per hour. Molecular weight determinations were made on the samples, after 5, 10 and 15 pounds respectively of oxygen per 100 pounds of wax had reacted, by the method described in the article by I. Harris, published in Journal of Polymer Science 8, 353 (1952), which involves determination of a xylene solution viscosity, in an Ostwald viscosimeter at 75° C. and calculation of the molecular weight from the data thus obtained.

Results are shown in Table III below.

*Table III*

Pounds O₂ reacted per 100 pounds wax:

| | Molecular weight |
|---|---|
| 0 | 2,000 |
| 5 | 1,500 |
| 10 | 1,200 |
| 15 | 1,000 |

A similar oxidation carried out on a polyethylene/isopropyl alcohol telomer of initial molecular weight of about 1,500 resulted in reduction of the molecular weight of the wax to about 650 after continuation of the oxidation at the rate indicated, until 17 pounds of oxygen per 100 pounds of charge had reacted.

EXAMPLE 13

To illustrate the effect of degree of oxidation on the hardness, viscosity and acid number characteristics of the resulting waxes, a series of three oxidations was carried out as described, of a polyethylene/isopropanol telomer wax having an average molecular weight of about 2,000, an initial hardness of 0.53 mm. as measured by the Standard ASTM penetration test D–5–25 at 77° F., with a 200 gm. weight for 5 seconds, and an acid number of zero. Oxidation rate was such that 3.5 pounds of oxygen per 100 pounds of wax reacted per hour. One oxidation was terminated after 5 pounds of oxygen per 100 pounds of wax had reacted, the second after reaction of 10 and the third after reaction of 16 pounds of oxygen. The resulting waxes were subjected to hardness, viscosity and acid number determinations with the results shown in Table IV below.

*Table IV*

| Pounds oxygen reacted per 100 pounds wax | Penetration (mm.) | Viscosity | Acid number |
|---|---|---|---|
| 0 | .53 | 60 | 0 |
| 5 | .80 | 45 | 16 |
| 10 | 1.10 | 33 | 29 |
| 16 | 1.70 | 29 | 45 |

EXAMPLE 14

A second series of three oxidations was carried out in a manner identical to that employed in Example 12 above, using as starting material a polyethylene/isopropanol telomer wax having an average molecular weight of about 1500, a Saybolt viscosity of 63 and a hardness measured by the ASTM D-5-25 penetration test at 77° F., 200 gm., 5 sec., of 0.55 mm. Oxidations were terminated after 2.8, 5.1 and 7 pounds, respectively, of oxygen per 100 pounds of wax had reacted. The resulting waxes were subjected to viscosity, penetration and acid number determinations with the results shown in Table V below.

*Table V*

| Pounds oxygen reacted per 100 pounds wax | Penetration | Viscosity | Acid number |
|---|---|---|---|
| 0 | 0.55 | 63 | 0 |
| 2.8 | 0.70 | 42 | 10 |
| 5.1 | 0.79 | 38 | 15 |
| 7.0 | 0.99 | 31 | 21 |

EXAMPLES 15 AND 16

Two 30 lb. polyethylene/isopropanol telomer wax samples having average molecular weights of about 2,000, hardness characteristics of 0.11 mm. and 0.07 mm. respectively, and initial toughness characteristics corresponding to impact values of 4.8 were oxidized in the manner generally described in the foregoing examples, at temperatures between 145° C. and 155° C. and 600 p.s.i.g. pressure, the oxidation being continued until 4 pounds of oxygen per 100 pounds of wax had reacted, and under the conditions and with the results shown in Table VI below.

*Table VI*

| Ex. | Reaction rate | Acid number | Penetration (mm.) Initial | Penetration (mm.) Final | Final viscosity | Impact |
|---|---|---|---|---|---|---|
| 15 | 2.5 | 11.6 | 0.11 | 0.17 | 226 | 4.8 |
| 16 | 1.8 | 14.0 | 0.07 | 0.18 | 135 | 2.0 |

EXAMPLE 17

A twenty pound sample of Fischer-Tropsch wax, having an average molecular weight of about 1,000 was subjected to oxidation by the general procedure described in the foregoing examples at a pressure of 300 p.s.i.g., temperatures between 135° C. and 141° C. and a reaction rate of 1.1 pounds of oxygen absorbed per 100 pounds of wax per hour. The reaction was continued until 1 pound of oxygen had reacted i.e. 5 pounds per 100 pounds of wax charged.

The resulting oxidized wax product had the properties shown in Table VII below.

*Table VII*

PROPERTIES OF OXIDIZED FISCHER-TROPSCH WAX

| | |
|---|---|
| Initial penetration (unoxidized) mm | 0.03 |
| Final penetration mm | 0.22 |
| Initial viscosity (unoxidized) | 13 |
| Final viscosity | 14 |
| Acid No | 22 |
| Saponification No | 29 |
| Color N.P.A | <1 |
| Emulsion appearance | Milky |
| Emulsion stability | Fair |

EXAMPLES 18–21

Mixtures of Fischer-Tropsch wax having average molecular weight of about 1,000, with a polyethylene/isopropanol telomer of 2,000 average molecular weight were oxidized in the manner described in the foregoing examples under the conditions, and with the results shown in Table VIII below.

*Table VIII*

OXIDATIONS OF MIXTURES OF FISCHER-TROPSCH WAXES AND POLYETHYLENE WAX

| Example No. | 18 | 19 | 20 | 21 |
|---|---|---|---|---|
| Charge, pounds, total | 30 | 30 | 30 | 30 |
| Polyethylene | 12 | 15 | 12 | 7.5 |
| Fischer-Tropsch | 18 | 15 | 18 | 22.5 |
| Reaction conditions: | | | | |
| Temperature, °C | 137–142 | 134–142 | 138–142 | 134–143 |
| Pressure, p.s.i.g | 300 | 300 | 300 | 300 |
| Reaction rate | 1.3 | 1.1 | 1.5 | 1.5 |
| O₂ reacted/100 lbs | 4.0 | 5.7 | 7.0 | 6.7 |
| Product properties: | | | | |
| Initial penetration (mm) (unoxidized) | .09 | 0.07 | 0.09 | 0.07 |
| Final penetration (mm) | 0.16 | 0.19 | 0.24 | 0.19 |
| Initial viscosity (unoxidized) | 37 | 50 | 38 | 24 |
| Final viscosity | 29 | 27 | 25 | 18 |
| Acid number | 10 | 16 | 22 | 16 |
| Saponification number | 17 | 23 | 28 | 27 |
| Color N.P.A | <1 | <1 | <1 | <1 |
| Emulsion appearance | Milky | Transl. | Transl. | Sl. transl. |
| Emulsion stability | V.g. | V.g. | V.g. | Good |

The new oxidized waxes of my invention form stable, translucent emulsions which are easily prepared, and are capable of producing formulations containing high percentages of solids. They are useful, in general, in applications for which hard, emulsifiable waxes are adapted. Thus, they may be used in floor waxes of both paste and emulsion types and in coatings of various types in the asbestos shingle, paper and textile industries and in coatings and inks for application to various surfaces, including glass and metals. The waxes of the invention may be used in blends with other waxes notably with the soft waxes to improve and upgrade them.

While the above describes the preferred embodiments of my invention, it will be understood that departures may be made therefrom within the scope of the specification and claims.

I claim:

1. A process for the controlled oxidation of normally solid, hard, waxy essentially polyethylenic compounds prepared by polymerizing ethylene in the presence of a co-reactant selected from the group consisting of saturated compounds of carbon, hydrogen and oxygen and aralkane compounds characterized by the presence of a recurring —$CH_2$— group and having average molecular weights between about 1,000 and about 3,000, melting points between about 160° F. and about 240° F., Saybolt Furol viscosities at 140° C. between about 10 seconds and about 1,000 seconds, and hardness characteristics of not more than about 0.7 mm. as measured in terms of penetration by the Standard ASTM method D-5-25, which comprises subjecting such waxes in the molten state to the action of an oxygen-containing gas by dispersing one throughout the other under conditions to cause reaction of oxygen with the wax at the rate of between about ½ pound and about 7 pounds of oxygen per 100 pounds of wax per hour for a period sufficient to cause the absorption of at least about 1 pound of oxygen per 100 pounds of wax and attainment of a saponification number of not more than about 50 whereby a hard waxy material, readily emulsifiable in water is produced.

2. A process for the controlled oxidation of normally solid, hard, waxy essentially polyethylenic compounds prepared by polymerizing ethylene in the presence of a co-reactant selected from the group consisting of saturated compounds of carbon, hydrogen and oxygen and aralkane compounds characterized by the presence of recurring —$CH_2$— groups and having average molecular weights between about 1,000 and about 3,000, melting points between about 160° F. and about 240° F., Saybolt Furol viscosities at 140° C. between about 10 seconds and about 1,000 seconds, and hardness characteristics of not more than about 0.7 mm. as measured in terms of penetration by the Stanard ASTM method D–5–25, which comprises subjecting such waxes in the molten state at temperatures between about 135° C. and about 175° C. and at pressures between about 200 and about 800 p.s.i.g. to the action of sufficient oxygen-containing gas by dispersing said gas throughout the body of the molten wax to produce the reaction of oxygen with the waxy material at the rate of between about ½ pound and about 7 pounds of oxygen per 100 pounds of waxy compound per hour, and discontinuing the reaction after not less than about 1 and not more than about 17 pounds of oxygen per 100 pounds of wax have been absorbed and a saponification number of not more than about 50 has been attained.

3. A process for the controlled oxidation of normally solid polyethylene waxes prepared by polymerizing ethylene in the presence of a co-reactant selected from the group consisting of saturated compounds of carbon, hydrogen and oxygen and aralkane compounds having average molecular weights between about 1,000 and about 3,000, melting points between about 160° F. and about 240° F., Saybol Furol viscosities at 140° C. between about 10 seconds and about 1,000 seconds, and hardness characteristics of not more than about 0.7 mm. as measured in terms of penetration by the standard ASTM method D–5–25, which comprises subjecting such waxes in the molten state to the action of an oxygen-containing gas by dispersing said gas throughout the body of the molten wax under such conditions as to cause reaction of oxygen with the wax at a rate of between about ½ pound and about 7 pounds of oxygen per 100 pounds of wax per hour, for a period sufficient to cause the absorption of at least about 1 pound of oxygen per 100 pounds of wax and attainment of a saponification number of not more than about 50 whereby a hard waxy material, readily emulsifiable in water is produced.

4. The process according to claim 3 wherein the reaction rate is between about 2 pounds and about 5 pounds of oxygen per 100 pounds of wax per hour, and wherein the reaction is continued until between about 1 and about 7 pounds of oxygen has been reacted and a saponification number of not more than about 50 has been attained.

5. A process for the controlled oxidation of normally solid polyethylene waxes prepared by polymerizing ethylene in the presence of a co-reactant selected from the group consisting of saturated compounds of carbon, hydrogen and oxygen and aralkane compounds having average molecular weights between about 1,000 and about 3,000 and initial hardness characteristics of not more than about 0.7 mm. as measured in terms of penetration by the standard ASTM method D–5–25, which comprises subjecting such waxes in the molten state to the action of sufficient oxygen-containing gas by dispersing said gas throughout the body of the molten wax at temperatures between about 135° C. and about 175° C. to cause the absorption of oxygen by the wax at a rate of between about ½ pound and about 7 pounds of oxygen per 100 pounds of wax per hour for a period sufficient to cause the reaction of between about 1 and about 7 pounds of oxygen per 100 pounds of wax and reduction in hardness of the wax by not more than about 0.3 mm., and attainment of a saponification number of not more than about 21.

6. A hard, waxy, oxygenated, essentially polyethylenic compound characterized by recurring —$CH_2$— groups and by ready emulsifiability in water, having an average molecular weight between about 500 and about 3,000, oxygen content between about 1% and about 17% by weight, having melt viscosities not more than about 1,000 seconds at 140° C. by the Saybolt-Furol test, penetration of not more than about 1.5 mm. as measured by ASTM test method D–5–25, toughness of at least about 2 foot pounds per linear inch as measured by ASTM test method D–256–47T, and a saponification number between about 10 and about 50, and a ratio of saponification number to acid number of about 1:1, produced by subjecting, in the molten state, a normally solid, hard, waxy essentially polyethylenic compound having a melting point between about 71° F. and about 240° F. and Saybolt-Furol viscosity at 140° C. between about 10 seconds and about 1,000 seconds, characterized by recurring —$CH_2$— groups, having an average molecular weight between about 1,000 and about 3,000, penetration by ASTM test method D–5–25 of not more than about 0.7 mm., to the action of an oxygen-containing gas, by dispersing the one throughout the other at temperatures between about 135° C. and about 175° C. and causing reaction of oxygen with said waxy compound at the rate of between about ½ pound and about 7 pounds of oxygen per hour per 100 pounds of waxy compound until an acid number of at least about 10 and not more than about 50 has been obtained, said polyethylenic compound having been prepared by polymerizing ethylene in the presence of a co-reactant selected from the group consisting of saturated compounds of carbon, hydrogen and oxygen and aralkane compounds.

7. The oxygenated polyethylenic compound according to claim 6 wherein the coreactant is isopropanol and wherein saponification number is between about 10 and about 21.

8. The oxygenated polyethylenic compound according to claim 6 wherein the coreactant is isopropanol and wherein saponification number is between about 30 and about 50.

9. A process for producing a hard, waxy oxygenated polyethylenic compound having an average molecular weight between about 1,000 and about 3,000, and containing between about 1% and about 17% combined oxygen by weight, characterized by recurring —$CH_2$— groups and by ready emulsifiability in water, by an acid number between about 10 and about 50, by toughness of at least about 2 foot pounds per linear inch as measured by ASTM test method D–256–47T and by penetration of not more than about 1.5 as measured by ASTM test method D–5–25, which comprises contacting a normally solid, hard, waxy polyethylenic compound prepared by polymerization of ethylene in the presence of a co-reactant selected from the group consisting of saturated compounds of carbon, hydrogen and oxygen and aralkane compounds, said waxy polyethylenic compound being characterized by recurring —$CH_2$— groups, having an average molecular weight between about 1,000 and about 3,000, melting point between about 160° F. and about 240° F., Saybolt-Furol viscosity at 140° C. between about 10 seconds and about 1,000 seconds, and hardness characteristics of not more than about 0.7 mm. penetration as measured by ASTM test method D–5–25, in the molten state, at temperatuures between about 135° C. and about 175° C. and $O_2$ partial pressures between about ⅓ atmosphere and about 200 p.s.i.g. with an oxygen-containing gas, by dispersing the one throughout the other, said conditions being coordinated to cause reaction of oxygen with the wax at the rate of between about ½ pound and about 7 pounds of oxygen per 100 pounds of wax per hour for a period to cause reaction of at least about 1 pound of oxygen per 100 pounds of wax and attainment of a saponification number of not more than about 50.

(References on following page)

References Cited in the file of this patent

UNITED STATES PATENTS

| | | |
|---|---|---|
| 2,151,106 | Hentrich et al. | Mar. 21, 1939 |
| 2,486,454 | Zellner | Nov. 1, 1949 |
| 2,616,916 | Heinrich | Nov. 4, 1952 |
| 2,631,160 | Linn | Mar. 10, 1953 |
| 2,660,601 | Dickinson | Nov. 24, 1953 |
| 2,674,613 | Nelson | Apr. 6, 1954 |
| 2,766,214 | Erchak et al. | Oct. 9, 1956 |

FOREIGN PATENTS

| | | |
|---|---|---|
| 581,279 | Great Britain | Oct. 7, 1946 |